(12) United States Patent
Rantze

(10) Patent No.: US 6,536,658 B1
(45) Date of Patent: Mar. 25, 2003

(54) METHOD AND APPARATUS FOR OPERATING A RETAIL TERMINAL HAVING A PROXIMITY DETECTOR THAT IS OPERABLE TO ASCERTAIN MOVEMENT AND DISTANCE OF A CONSUMER RELATIVE TO THE RETAIL TERMINAL

(75) Inventor: Edward G. Rantze, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/473,528

(22) Filed: Dec. 28, 1999

(51) Int. Cl.[7] .............................................. G06F 17/00
(52) U.S. Cl. ...................................... 235/375; 235/380
(58) Field of Search ............................ 705/16; 340/517, 340/524, 525; 377/17, 42, 55, 56; 235/375, 380

(56) References Cited

U.S. PATENT DOCUMENTS

| | | | | |
|---|---|---|---|---|
| 3,865,305 A | * | 2/1975 | Sampey | 235/92 DN |
| 4,760,490 A | | 7/1988 | Murao | |
| 4,799,243 A | * | 1/1989 | Zepke | 377/6 |
| 4,951,045 A | * | 8/1990 | Knapp et al. | 340/944 |
| 5,245,163 A | * | 9/1993 | Yehuda | 235/377 |
| 5,437,057 A | * | 7/1995 | Ichley et al. | 455/41 |
| 5,485,634 A | * | 1/1996 | Weiser et al. | 455/53.1 |
| 5,548,764 A | | 8/1996 | Duley et al. | |
| 5,555,376 A | | 9/1996 | Theimer et al. | |
| 5,603,054 A | | 2/1997 | Theimer et al. | |
| 5,615,391 A | * | 3/1997 | Klees | 395/839 |
| 5,675,810 A | | 10/1997 | Sellers | |
| 5,767,844 A | | 6/1998 | Stoye | |
| 6,081,619 A | * | 6/2000 | Hashimoto et al. | 382/181 |
| 6,380,853 B1 | * | 4/2002 | Long et al. | 340/525 |

* cited by examiner

*Primary Examiner*—Michael Cuff
(74) *Attorney, Agent, or Firm*—Maginot, Moore & Bowman LLP

(57) ABSTRACT

A method and apparatus for operating a retail terminal, such as a kiosk, includes a proximity detector that is operable to ascertain movement of a consumer relative to the retail terminal and the distance therefrom. The retail terminal may use the movement/distance measurement to either power-up the retail terminal from a power-down mode or change the mode of operation of the retail terminal. A transmitter emits waveforms of preferably different frequencies that reflect from objects (e.g. a consumer) within various zones. The reflected waveforms are received by a detector in the retail terminal and analyzed to determine movement and/or distance that the consumer is relative to the retail terminal. A retail terminal is also provided.

20 Claims, 4 Drawing Sheets

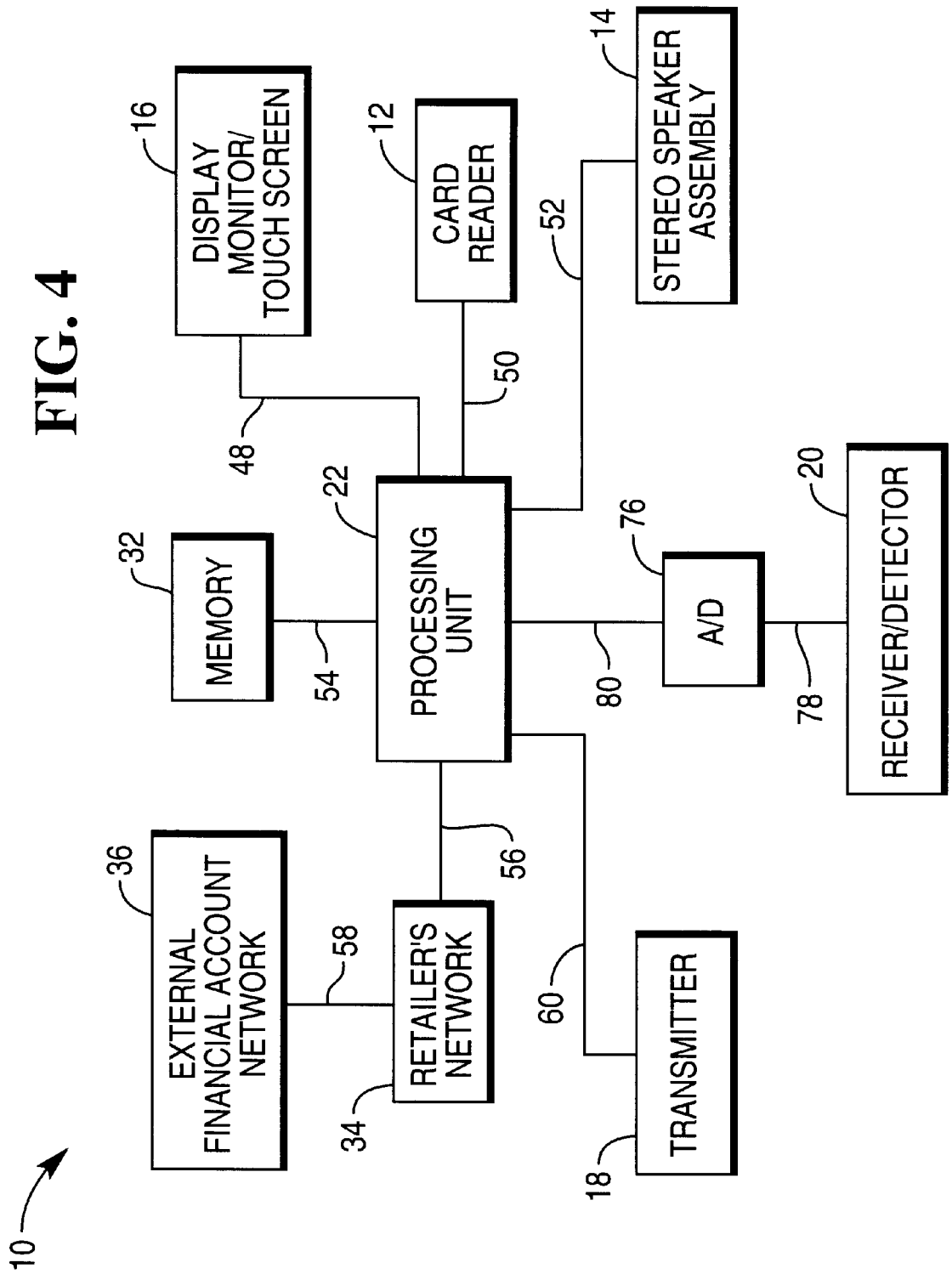

METHOD AND APPARATUS FOR OPERATING A RETAIL TERMINAL HAVING A PROXIMITY DETECTOR THAT IS OPERABLE TO ASCERTAIN MOVEMENT AND DISTANCE OF A CONSUMER RELATIVE TO THE RETAIL TERMINAL

TECHNICAL FIELD OF THE INVENTION

The present invention relates generally to a retail terminal, and more particularly to a method and apparatus for operating a retail terminal having a proximity detector that is operable to ascertain movement and distance of a consumer relative to the retail terminal.

BACKGROUND OF THE INVENTION

In the retail industry, a number of electronic retail terminals are used throughout a retail store. For example, the retail store may include a number of point-of-sale (POS) terminals such as traditional assisted (i.e. clerk-operated) checkout terminals. In addition to assisted point-of-sale terminals, the retail store may also include a number of unassisted point-of-sale terminals such as self-service checkout terminals. Self-service checkout terminals are terminals which are operated by a customer without the assistance of a retail clerk.

Moreover, in addition to point-of-sale terminals, the retail store may also include a number of information retail terminals such as kiosk-type devices. Such information retail terminals are generally located throughout the shopping area of the retail store and are provided to perform various information retail functions such as a product demonstration function (e.g. an audio/video advertisement), a customer data collection function (e.g. collecting and maintaining a customer profile database), and in some cases even a transaction function in which a customer may use the kiosk to tender payment for his or her items for purchase. In summary, information retail terminals may be used to display product information to retail customers, or may be used as an interactive retail terminal which provides assistance to customers in response to a customer's input via a keypad or the like.

A typical kiosk session begins at a logical starting point such as a "home" page. From this page, the user is able to navigate through additional pages by using a keypad, mouse, touch screen monitor, or other input device. The user can then view product information or in some cases even purchase products if the kiosk is equipped with a payment device such as a card reader device for allowing the user to tender payment with his or her credit, debit, or smart card.

When the user is finished with the session, or when the user walks away, it is desirable to reset the kiosk. What is meant herein by the term "reset" or "resetting" in regard to operation of the kiosk is the halting or otherwise ending of the current terminal session and the returning of the kiosk to a predetermined idle state in which the kiosk is rendered prepared for subsequent users. For example, the kiosk may be reset by ending the current terminal session and returning to the "home" page so that the kiosk is in a logical starting place for subsequent users. The kiosk is typically reset by the user when the user desires to end his or her terminal session. In particular, when the user desires to end his or her terminal session, the user typically presses a predetermined button on a keypad, or location on a touch screen which causes the kiosk to be reset. In addition, the kiosk may have several different types of audio/video messages depending on whether someone is proximate the kiosk, walking by the kiosk, or approaching the kiosk.

Generally, when a retail terminal has not been in use for a predetermined time period or no one has approached, walked past or touched the retail terminal, the retail terminal may enter a power down mode. A power down mode generally extends the life of the retail terminal in addition to saving energy. Once the retail terminal is in a power-down mode, it needs to be activated by an external event. Once activated, the retail terminal may enter a first mode of operation before entering into a second mode of operation through user intervention or automation.

Prior art retail terminals have utilized several methods of customer or user detection to provide a means for activating the retail terminal during a power-down mode or for changing modes of operation. The prior art event activation methods for consumer detection by the retail terminal typically, includes an infrared or ambient light scheme. Other detection methods include user intervention such as touching the retail terminal and capicitance circuits. These prior art schemes however, do not employ true proximity detection. Rather, these prior art schemes are mere detection of a consumer within a single zone or area. The prior art schemes, trigger when a customer is within the particular zone of the retail terminal defined by the detection scheme, or touches the retail terminal in some manner without regard to actual distance therefrom.

It would be desirable for a retail terminal to be able to detect the approximate distance that a customer or user is to the retail terminal.

It would also be desirable for a retail terminal to be able to detect the movement of a customer relative to the retail terminal.

Thus, at times it would be desirable for a retail terminal such as a kiosk to detect whether a consumer is approaching, walking by, or walking away from the unit in addition to the detection within a specific area about the kiosk for powering up the kiosk. Such detection could help prevent false activation of the kiosk, such as if someone was simply walking past the kiosk and not actually approaching it. Additionally, some retail terminal devices, such as an information kiosk, could change modes of operation depending on the actual distance the user or customer is to the information kiosk. As an example, if someone is just walking past the kiosk and not approaching it, it would be desirable that the kiosk would recognize this fact and could play a sound clip to try and attract the potential user to come back to the kiosk. Similarly, if a user was actually approaching the kiosk, the information on the screen could change as the user approached closer.

Thus, it would also be desirable to provide a retail terminal such as a kiosk which is capable of performing in various modes depending on whether a customer is proximate the retail terminal, walking away from the retail terminal, walking by the retail terminal, or walking towards the retail terminal. Moreover, it is desirable to provide a retail terminal that can be configured to perform in such various modes depending on the position or distance and the movement of the customer relative the retail terminal. In addition, it is desirable to provide a retail terminal that allows a retailer to determine traffic patterns associated with customer movement throughout the retailer's store.

What is needed therefore is a retail terminal which overcomes one or more of the above-mentioned drawbacks and achieves the desired provisions stated above.

SUMMARY OF THE INVENTION

In accordance with a first embodiment of the present invention, there is provided a method of operating a retail terminal. The method of operating the retail terminal, includes the steps of transmitting a pulse train signal with a transmitter, receiving any return pulse train signal produced by reflection of the pulse train signal from a consumer with a detector, processing the return pulse train to determine if the consumer producing the return pulse is approaching or leaving the retail terminal, producing a consumer movement signal in response to and consistent with the determination of whether the consumer is approaching or leaving the retail terminal, and changing a mode of operation of the retail terminal depending on the consumer movement signal.

In accordance with an aspect of the first embodiment, the pulse train signal comprises a sequence of frequencies with each frequency pulsed for a predetermined period of time at a predetermined amplitude. Further, it is preferable that the pulse train be transmitted, detected, and analyzed continuously.

Still further, it is preferable that the step of processing the return pulse train to determine if the consumer producing the return pulse signal is approaching or leaving the retail terminal, includes the steps of comparing the amplitude of each return frequency of the return sequence of frequencies to a threshold amplitude stored in the memory device corresponding to each frequency of the sequence of frequencies, generating and storing a threshold exceeded flag for each frequency of the return sequence of frequencies of which the threshold amplitude has been exceeded, and producing an approaching consumer movement signal if the number of threshold flags increases, else producing a leaving consumer movement signal if the number of threshold flags decreases, then producing a leaving consumer movement signal. According to one aspect, the return sequence of frequencies is filtered into component frequencies before the step of comparing the amplitude of each return frequency of the return sequence of frequencies to a threshold amplitude stored in the memory device corresponding to each frequency of the sequence of frequencies.

In accordance with a second embodiment of the present invention, there is provided a retail terminal. The retail terminal comprises a transceiver for (i) transmitting a pulse train signal, and (ii) receiving a return pulse train signal produced by reflection of the pulse train signal from a consumer, a processing unit electrically coupled to the transceiver, and a memory device electronically coupled to the processing unit. The memory device has a plurality of instructions stored therein which, when executed by the processing unit, causes the processing unit to (a) transmit the pulse train signal with the transceiver, (b) receive any return pulse train signal with the transceiver, (c) analyze the return pulse train signal to determine if the consumer producing the return pulse train signal is approaching or leaving the retail terminal, (d) produce a consumer movement signal in response to and consistent with the determination of whether the consumer is approaching or leaving the retail terminal, and (e) change a mode of operation of the retail terminal depending on the consumer movement signal.

It is preferable that the pulse train comprise a sequence of frequencies with each frequency pulsed for a predetermined period of time at a predetermined amplitude. Further, it is preferable that the memory device has further instructions stored therein to analyze the return pulse train signal having a return sequence of frequencies to determine if the consumer producing the return pulse train signal is approaching or leaving the retail terminal.

The determination may be accomplished by (1) comparing the amplitude of each return frequency of the return sequence of frequencies to a threshold amplitude value stored in the memory device corresponding to each frequency of the sequence of frequencies, (2) generating and storing a threshold exceeded flag for each frequency of the sequence of frequencies of which the threshold amplitude has been exceeded, and (3) if the number of threshold exceeded flags increases during a predetermined time period, then producing an approaching consumer movement signal, else if the number of threshold exceeded flags decreases during a predetermined time period, then producing a leaving consumer movement signal.

It is therefore an object of the present invention to provide a new and useful apparatus and method of operating a retail terminal.

It is another an object of the present invention to provide an improved apparatus and method of operating a retail terminal.

It is yet another object of the present invention to provide a retail terminal that can detect the actual proximity or distance of a customer relative to the retail terminal.

It is still another object of the present invention to provide a retail terminal that can detect movement of a customer relative thereto.

It is further an object of the present invention to provide a retail terminal that can detect whether a customer is approaching (walking toward), leaving (walking away), or passing (walking by) the retail terminal.

It is still further an object of the present invention to provide a retail terminal that is operable in various modes depending on the proximity or distance that a customer is to the retail terminal;

It is also another object of the present invention to provide a retail terminal that is operable in various modes depending on movement of the customer relative to the retail terminal.

The above and other objects, features, and advantages of the present invention will become apparent from the following description and the attached drawings.

BRIEF DESCRIPTION OF THE DRAWINGS

FIG. 4 is a simplified block diagram of a second embodiment of the retail terminal of FIG. 1.

DETAILED DESCRIPTION OF THE INVENTION

Figure 1:
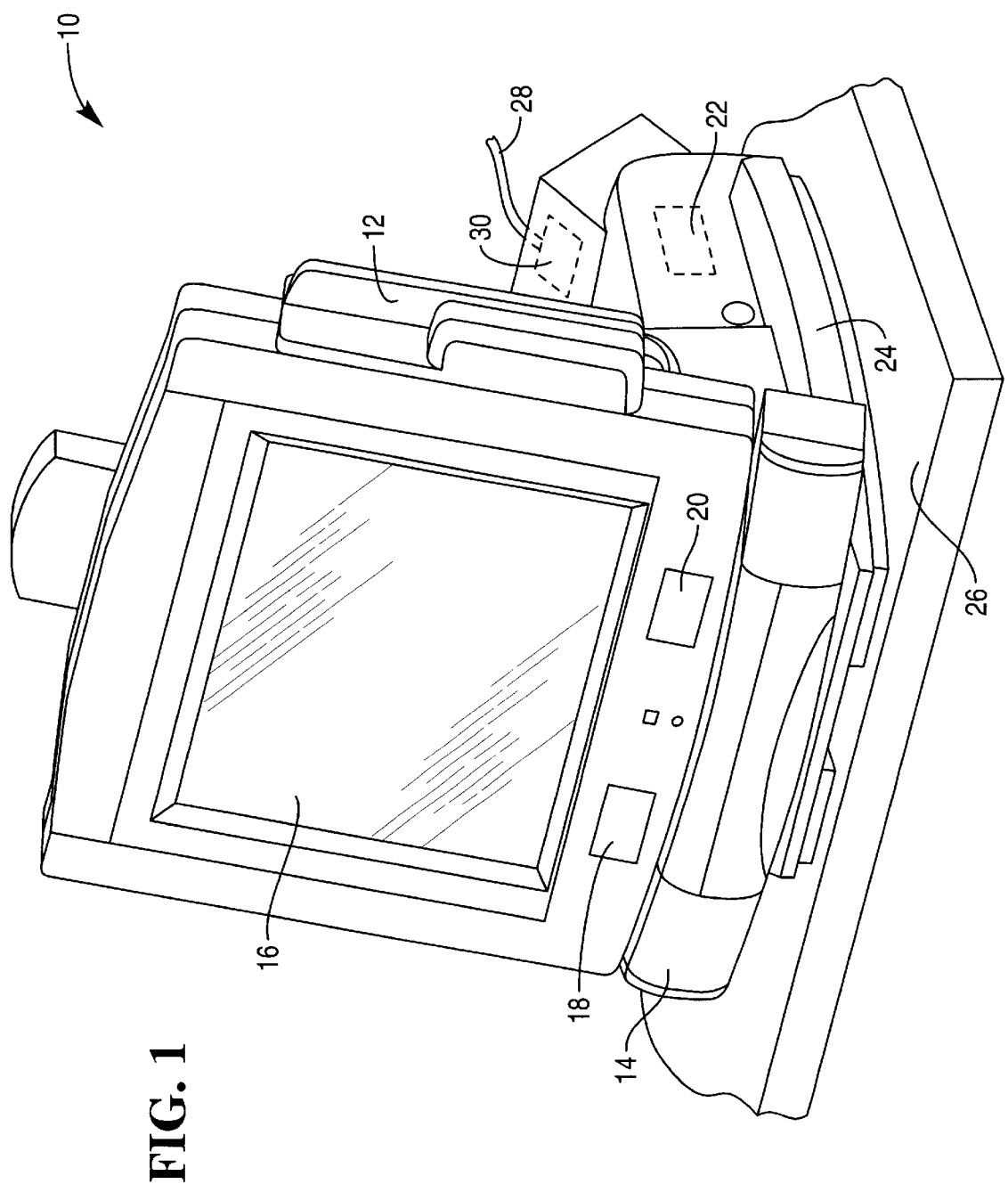
FIG. 1 is a perspective view of a consumer interactive retail terminal which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is shown an information retail terminal 10, preferably of a consumer interactive type but not necessarily so such as a kiosk, that that may be configured to perform a number of retail functions such as (i) a point-of-sale retail function, (ii) a product demonstration retail function, (iii) a data collection function, and/or (iv) a passive display function or the like. Hereinafter, the retail terminal 10 will be referred to as a kiosk but consistent with the above should be understood to include all types of retail terminals. The kiosk 10 may be utilized to perform either assisted or unassisted retail functions during an active or power-up mode.

What is meant herein by the term "point-of-sale retail function" is a function performed by a retail terminal when the retail terminal is being operated to check out items for purchase. Some examples of point-of-sale retail functions include (i) entering items into a memory of the retail terminal with a scanner device, (ii) entering items into a memory of the retail terminal with a touch screen input device, (iii) calculating cost of items entered into the retail terminal, and (iv) displaying transaction data including total cost of entered items on a display monitor.

Moreover, what is meant herein by the term "product demonstration retail function" is a function performed by a retail terminal when the retail terminal is being operated or in a particular mode to provide retail information to a customer. Such retail information may include (i) product information such as item description or price, and (ii) store layout information such as product location within the store. Some examples of product demonstration retail functions include (i) entering a retail information query into a memory of the retail terminal with a scanner device, (ii) entering a retail information query into a memory of the retail terminal with a touch screen input device, (iii) comparing data of a retail information query to a product database, (iv) displaying product information on a display monitor in response to retrieval of a retail information query, (v) playing an audio/video product commercial with a display monitor and associated speaker assembly, (vi) displaying educational or entertainment programs such as a "how to" demonstration or an education based video game, and (vii) displaying a program which identifies various uses for a product such as a recipe demonstration program.

In addition, what is meant herein by the term "data collection function" is a function performed by a retail terminal when the retail terminal is being operated to provide a retailer with data associated with a customer's behavioral pattern within the retailer's store or perception of the retailer's operation. Such data may include (i) customer traffic patterns associated with customer movement within the retailer's store, and (ii) survey information associated with a customer's perception of the retailer's operation. Hence, some examples of data collection functions include (i) counting the number of customer's which shop in a particular aisle or within a particular area of the retailer's store, (ii) displaying a retail survey question, and (iii) entering a response to a displayed retail survey question into a memory of the retail terminal with a touch screen device.

Moreover, what is meant herein by the term "passive display function" is a function performed by a retail terminal when the retail terminal is being operated in a passive manner without the intent to communicate any particular information to a customer. Some examples of passive display functions include (i) playing of background music or other types of audible tones with a speaker assembly, (ii) displaying of an artistic or pictorial image, such as a screen saver, on a display monitor, and (iii) operating the terminal in a "sleep" mode in which the display monitor and/or the speaker assembly associated with the terminal are inactive or otherwise not generating video and/or audio output, respectively.

What is meant herein by the term "assisted retail functions" are those retail functions performed by a retail terminal when the retail terminal is being operated by a clerk or associate which is employed by the retailer to operate the retail terminal. For example, an assisted retail function would be performed by the retail terminal 10 in response to a store-employed clerk scanning or otherwise entering a customer's items for purchase into the retail terminal, and thereafter depressing a payment-received key on the retail terminal which indicates that the customer paid for such items.

Moreover, what is meant herein by the term "unassisted retail functions" are those retail functions which are performed by a retail terminal by the customer himself or herself without the assistance of a clerk or other personnel employed by the retailer. For example, an unassisted retail function would be performed by the retail terminal 10 in response to a customer himself or herself scanning or otherwise entering items for purchase into the retail terminal, and depressing a payment key on the retail terminal which indicates that the customer paid for such items (e.g. by interaction with a credit/debit card reader or a cash acceptor). Another unassisted retail function would be performed by the retail terminal 10 in response to a customer himself or herself entering an information query into the retail terminal, such as a kiosk-type terminal, in order to retrieve product information from the retail terminal.

The kiosk 10 may be utilized in a retail store of the like in order to perform a number of different retail functions as indicated above. The kiosk 10 includes a card reader 12, a stereo speaker assembly 14, a display monitor 16, a transmitter 18, a receiver or detector 20, and a processing unit 22. As shown in FIG. 1, the kiosk 10 includes a base 24 that allows the kiosk 10 to be positioned on a flat surface such as a tabletop 26. However, it should be appreciated that the kiosk 10 of the present invention may be embodied in other configurations such as a wall mount configuration or as a "stand alone" unit that includes a free standing housing of any shape and size. The kiosk 10 is coupled to a source of electrical energy or power (not shown) as is known in the art via a power cord 28. The power cord 28 is electrically coupled to supply electrical energy to an electrical power module 30. The electrical power module 30 appropriately transforms the incoming electrical energy as necessary and distributes the appropriately transformed electrical energy to the various components as is well known in the art. It should thus be appreciated and therefore assumed unless indicated to the contrary, that any component mentioned herein which needs electrical energy is supplied the electrical energy via electrical power module 30 as is well known in the art.

The display monitor 16 may be any one of numerous known tube, plasma, or liquid crystal display (LCD) monitors and is provided to display various visual messages such as video product demonstrations or promotions, product advertisements, user profile interface screens, transaction information, or the like. In addition, if the kiosk 10 is operated to perform a sales or other type of payment transaction, the display monitor 16 may be used to display information associated with a sales transaction such as item cost, transaction total, or the like.

Moreover, the display monitor 16 is preferably a known touch screen monitor that can generate data signals when certain areas of the screen are touched by a user. It should be appreciated that such a configuration allows the display monitor 16 to function as a data input device thereby enabling interactive operation of the kiosk 10. For example, the kiosk 10 may be configured as an interactive customer assistance terminal in which a user touches a particular area of the touch screen associated with the display monitor 16 to enter an information request. The results of the request may then be displayed visually and/or audibly with the display monitor 16 and/or the speaker assembly 14.

The stereo speaker assembly 14 may include any known pair of stereo loudspeakers and is provided to broadcast various audio messages such as audio/video product demonstrations or other type of product advertisements. Moreover, the stereo speaker assembly 14 may be utilized to broadcast voice instructions to the user of the kiosk 10.

The card reader 12 may be any known magnetic strip reader including a credit and/or debit card reader, or a smart card reader and is provided to allow a user to tender payment for his or her goods or services for purchase. For example, the kiosk 10 may be utilized as a payment terminal that allows a user to access a personalized account and thereafter tender payment for goods and/or services by swiping his or her debit, credit, or smart card through the card reader 12.

The transmitter 18 may be any one of numerous known transmitters that are adapted to emit various types of radiation, such as electromagnetic, sound, elastic, or particulate, at various frequencies, and is preferably an infrared transmitter. The transmitter 18 is provided to transmit or emit radiation, as explained in detail below, that will reflect from a person (e.g. a user or customer) in the vicinity or proximate to the kiosk 10.

The detector or receiver 20 may be any one of numerous known detectors, sensors, or transducers that are adapted to receive or detect the type of radiation emitted by transmitter 18. As such, the detector 20 is preferably an infrared detector. The detector 20 is provided to receive radiation that has been reflected from a person within an area about the kiosk 10. As will be discussed below in greater detail, operation of the transmitter 18 and detector 20 (i.e. the detection of, proximity or distance to, and/or movement relative the kiosk 10 of a person) provides the kiosk 10 with information that may change the mode of operation of the kiosk 10, wake-up or activate the kiosk 10 from a power-down mode, or turn off or deactivate the kiosk 10.

The kiosk 10 preferably includes power-down or energy-saving circuitry/software as is known in the art to allow the kiosk 10 to enter a low-power consumption mode wherein typically, no video or audio is played by the kiosk 10. The kiosk 10 will terminate its power-down mode through an activating event and then enter a power-up, user, or activated mode. The activated mode itself may include various modes of operation. The present proximity detection system provides activating events.

Figure 2:
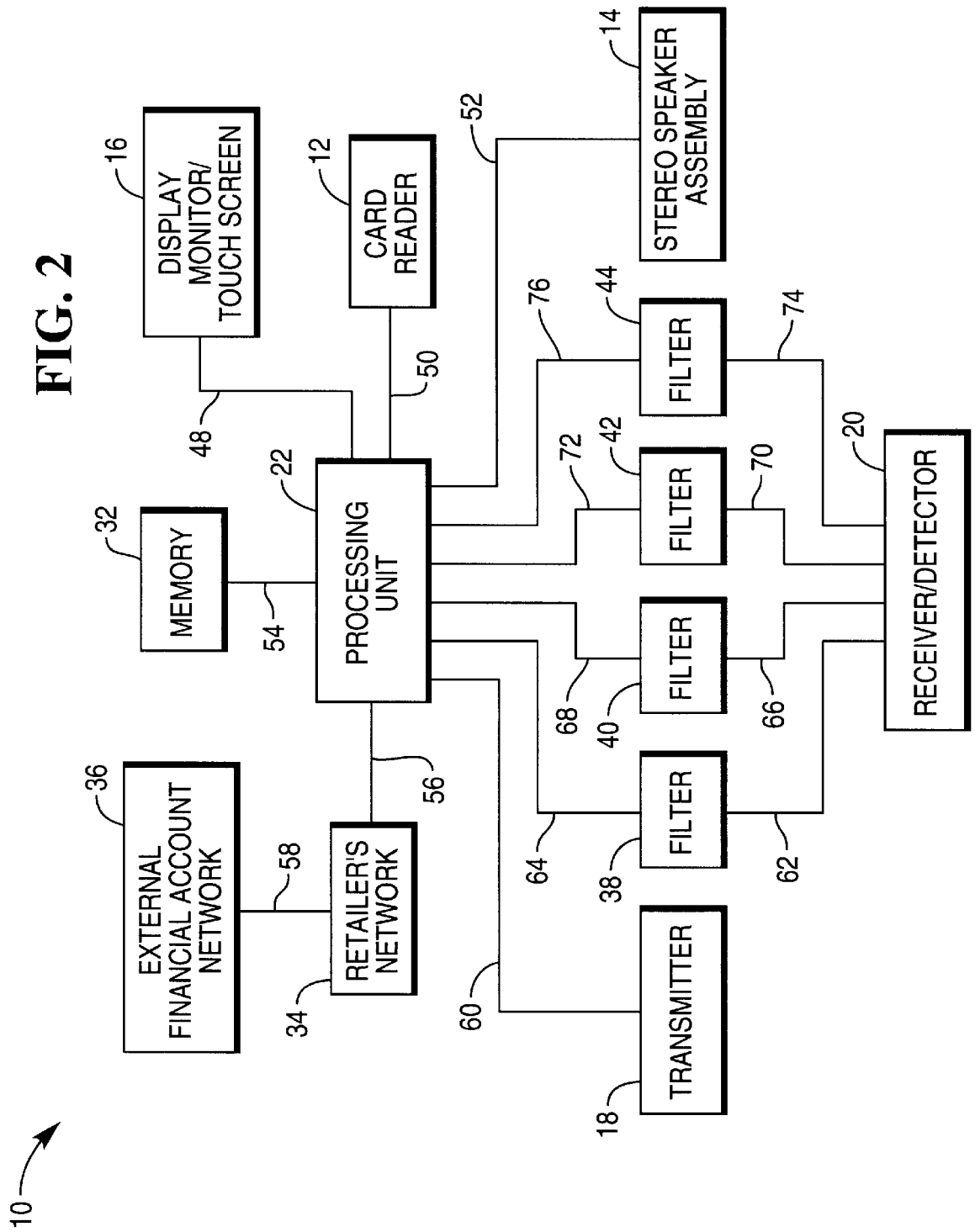
FIG. 2 is a simplified block diagram of one embodiment of the retail terminal of FIG. 1.

Referring now to FIG. 2, there is shown a simplified block diagram of the kiosk 10. The processing unit 22 is electrically coupled to the card reader 12, the speaker assembly 14, the display monitor 16, the transmitter 18 and the detector 20. The processing unit 22 is also electrically coupled to the memory 32 and to a network 34.

The processing unit 22 is electrically coupled to the display monitor 16 via a data communication line 48. In particular, the processing unit 22 generates output signals on the data communication line 48 which cause various video messages and images to be displayed on the display monitor 16. Moreover, as described above, the display monitor 16 preferably includes a touch screen as is known in the art which generates output signals when a user touches particular areas thereof. Hence, data indicative of the user's input to the touch screen is sent to the processing unit 22 via the data communication line 48.

The processing unit 22 is coupled to the card reader 12 via a data communication line 50. In particular, when a credit, debit, or smart card is swiped or otherwise advanced through the card reader 12, the card reader 12 generates an output signal on the data communication line 50 which corresponds to a code encoded on the user's card.

The processing unit 22 communicates with the stereo speaker assembly 14 through a data communication line 52. The processing unit 22 generates output signals on the data communication line 52 which cause various audio sounds and messages to be output by the stereo speaker assembly 14.

The processing unit 22 communicates with the memory 32 when necessary through a data communication line 54. In particular, the processing unit 22 generates output signals on the data communication line 54 which cause various data to be stored and/or retrieved from the memory 32 when necessary. Various program instructions or logic are also stored in the memory 32, that may be necessary to perform various tasks hereinunder. The memory 32 may be RAM or ROM static or volatile as is well known in the art, and is in addition to any memory within the processing unit 22.

The processing unit 22 includes network interface circuitry (not shown) that conventionally permits the kiosk 10 to communicate with the retailer's network 34 such as a LAN or WAN through a wired connection 56. The network interface circuitry associated with the kiosk 10 may include a known Ethernet expansion card, and the wired connection 56 may include a known twisted-pair communication line. Alternatively, the network interface circuitry may support wireless communications with the retailer's network 34.

The processing unit 22 communicates with the retailer's network 34 during a purchase transaction in order to obtain information, such as pricing information, associated with a good or service being purchased by the user. In addition, the processing unit 22 may communicate with the retailer's network 34 in order to access a personalized file associated with a particular user. What is meant herein by the term "personalized file" is an electronic file or database that contains data or other type of information that is personalized to a particular user. For example, a personalized file may include a user profile stored in the retailer's customer profile database that includes demographic or other type of information associated with a particular user. A personalized file may also include a user's file stored in the retailer's "frequent shopper" database which includes the purchase history of a given user. Other examples of personalized files may be readily apparent to those skilled in the art and may be selected to fit the needs of a given retailer's operation.

It should be further appreciated that access to personalized information such as a personalized file may or may not be restricted to information maintained by the components associated with the retailer's network 34. In particular, as shown in FIG. 2, the retailer's network 34 may be electrically coupled to one or more external networks such as a financial account network 36. The financial account network 36 is generally maintained by a banking or other financial institution and is utilized to communicate financial information to the retailer's network 34. In particular, approval for use of a user's credit or debit card may be obtained by communication with the financial account network 36. Moreover, the financial network 36 may be utilized to receive balances for a service account. For example, the kiosk 10 may be utilized by a customer to access information relating to the customer's account with a utility company (e.g. an electric company or gas company) or a service company (e.g. a cellular phone company) and thereafter allow the customer to pay for his or her outstanding balance with a credit or debit card. Hence, as described, the processing unit 22 may communicate with the retailer's network 34 (and thereafter the financial account network 36) in order to access a personalized account associated with a particular user. What is meant herein by the term "personalized account" is an electronic account that contains data or other types of information which is personalized to a particular user. Examples of personalized accounts include credit card accounts, checking/debit card accounts, service accounts for utilities or services, etcetera.

The processing unit 22 communicates with the transmitter 18 through a data communication line 60 in order to control and/or regulate the transmission or emission of radiation from the transmitter 18. Preferably, as described in detail below, the processing unit 22 sends control signals on the data communication line 60 to the transmitter 18 to control the transmission frequency, duration of transmission, sequencing and the like. Preferably, the processing unit 22 sends signals so as to pulse the transmitter 18 at a given frequency for a given time period. It is further preferable that the transmitter emit a plurality of frequencies each for a given time period that results in a pulse train of various frequencies. The resulting outgoing signal or pulse train is emitted by the transmitter 18 outwards toward a user area or zone that is defined about the kiosk 10 and shaped in part by the radiation pattern of the particular transmitter. The user area can thus be shaped according in one part to the type and style of transmitter. It should be appreciated that the control signals from the processing unit 22 to the transmitter 18 may take many forms to cause the transmitter 18 to emit signals of various time periods and/or sequences. It is preferable that the transmitter 18 emit pulses of multiple frequencies with each frequency being transmitted for a given amount of time. The length of time of each frequency transmission time period is variable and controlled by the processing unit 22. The total number of time periods and thus frequencies that may be sequenced together in a series is also variable and controlled by the processing unit 22. Further, it is preferable that the sequence repeats. Alternatively, pulses of a single modulated frequency may be transmitted for a given amount of time.

In FIG. 2, there is shown an embodiment of the present invention in which the detector 20 communicates with a plurality of filters, particularly one filter for each frequency of the sequence or series emitted by the transmitter 18. The detector 20 communicates with four filters 38, 40, 42, and 44 through data communication lines 62, 66, 70, and 74 respectively. It should be appreciated that the filters 38, 40, 42, and 44 are shown as separate filters but do not physically have to be separate and may be any type. Radiation that is emitted by transmitter 18 and then reflected from a user is received by detector 20 which communicates the received reflection signals to the four filters 38, 40, 42, and 44 via respective data communication lines 62, 66, 70, and 74. Each filter is adapted to pass only one of the frequencies emitted by the transmitter 18 and reflected back to the detector 20. In this example there are four frequencies transmitted, thus there are four filters. Each filter 38, 40, 42, and 44 is in data communication with the processing unit 22 via respective data communication lines 64, 68, 72, and 76. Hence, the filtered signal representing only one of the four emitted/reflected frequencies may pass from each filter to the processing unit 22 for further processing and/or analysis.

It should be appreciated that the embodiment depicted in FIG. 2 utilizes a separate filter for each frequency emitted by the transmitter 18 regardless of the duration of the signal of that frequency. The number of filters according to this embodiment is thus dependent on the number of frequencies transmitted by the transmitter 18. Accordingly, a change in the number of frequencies transmitted by the transmitter 18 changes the number of filters in communication with the detector 10 and the processing unit 22. The number of frequencies transmitted is variable. Therefore, it may be desirable to have configurable filters such as through software to adapt to changes in the frequency and frequency series.

Figure 3:
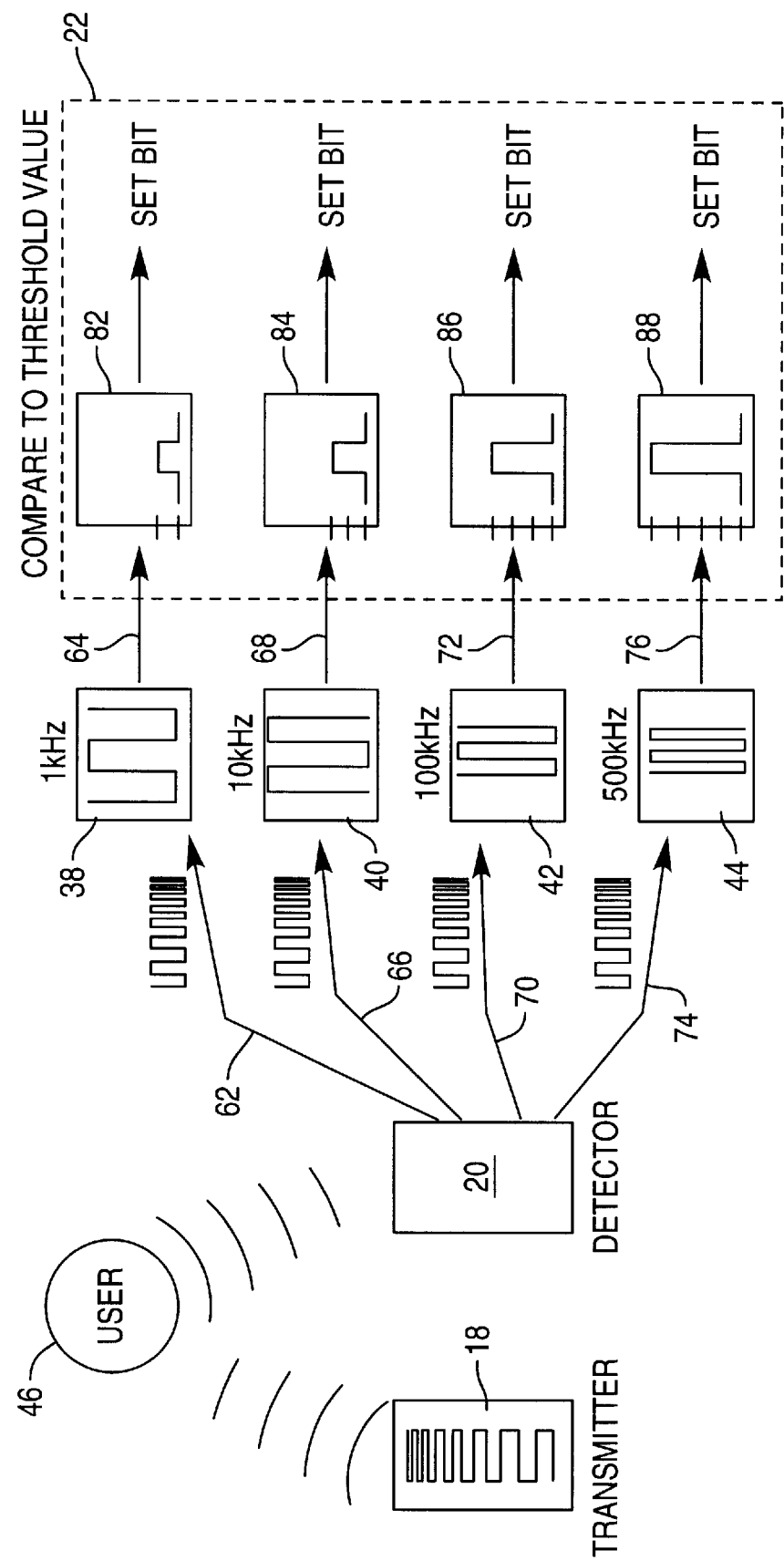
FIG. 3 is a simplified representative block diagram of the operation of the embodiment of FIG. 2.

In order to illustrate the above principles as detailed with reference to FIG. 2, reference is particularly directed to FIG. 3 through which will be described an exemplary scenario. The transmitter 18 under control of processing unit 22 emits first pulses of radiation of a first frequency, e.g. 1 kHz, for a first predetermined period of time, followed by second pulses of radiation of a second frequency, e.g. 10 kHz, for a second predetermined period of time, followed by third pulses of radiation of a third frequency, e.g. 100 kHz, for a third predetermined period of time, which is followed by fourth pulses of radiation of a fourth frequency, e.g. 500 kHz, for a fourth predetermined period of time. The four frequencies, 1 kHz, 10 kHz, 100 kHz, and 500 kHz are each transmitted at a predetermined amplitude. The selected amplitude value for each frequency should be less than a threshold amplitude value for each frequency. As explained below, the amplitude of each component frequency of the reflected and received signal is compared to a reference or threshold amplitude value. In the present example each frequency emission lasts for a predetermined period of time, e.g. 50 milliseconds, such that the total pulse train is 200 milliseconds long. The pulse train preferably is repeated continually such that the pulse train is repeated every 200 milliseconds. The emitted pulse train radiates from the kiosk 10.

When a user 46 is within the area of the kiosk 10, the pulse train will be reflected off the user 46. At least one of the reflected pulse train waveform signals is reflected towards the detector 20. The detector 20 receives at least part of the reflected pulse train waveform and communicates the reflected pulse train signal or waveform to the filters 38, 40, 42, and 44 via respective data communication lines 62, 66, 70, and 74. As indicated above, each filter passes only one frequency. Thus, the filter 38 passes only the 1 kHz component of the reflected pulse train signal and communicates the filtered 1 kHz component of the reflected pulse train signal to the processing unit 22 via data communication line 64. The filter 40 passes only the 10 kHz component of the reflected pulse train signal and communicates the filtered 10 kHz component of the reflected pulse train signal to the processing unit 22 via data communication line 68. The filter 42 passes only the 100 kHz component of the reflected pulse train signal and communicates the filtered 100 kHz component of the reflected pulse train signal to the processing unit 22 via data communication line 72. The filter 44 passes only the 500 kHz component of the reflected pulse train signal and communicates the filtered 500 kHz component of the reflected pulse train signal to the processing unit 22 via data communication line 76.

In general, the processing unit 22 compares the amplitude (instantaneous or average) of the waveform (signal) of each frequency component of the reflected pulse train to a predetermined threshold amplitude value preferably particular for each frequency. In particular, as shown in FIG. 3, the amplitude value for the 1 kHZ waveform from the filter 38 is compared to the threshold amplitude value for a 1 kHZ component. The threshold amplitude value is represented by the height of the waveform in graph 82 in accordance with the left most demarcations. The threshold amplitude value for the 10 kHz waveform from the filter 40 is compared to the threshold amplitude value for a 10 kHz component. The threshold amplitude value is represented by the height of the waveform in graph 84 in accordance with the left most demarcations. The amplitude value for the 100 kHz waveform from the filter 42 is compared to the threshold amplitude value for a 100 kHz component. The threshold amplitude value is represented by the height of the waveform in graph 86 in accordance with the left most demarcations. The amplitude value for the 500 kHz waveform from the filter 44 is compared to the threshold amplitude value for a 500 kHz component. The threshold amplitude value is represented by the height of the waveform in graph 88 in accordance with the left most demarcation. It should be appreciated that a single threshold amplitude may be used for all the frequencies as well as other characteristics of the signal.

In general, when the amplitude of the waveform of each filtered frequency component exceeds the predetermined threshold amplitude value for that particular frequency, a signal is generated and/or a flag or bit is set by the processing unit 22 to indicate that the threshold value has been reached (or exceeded). As successive thresholds are met for each frequency component, the number of flags set increases. An increase in flags set indicated a user approaching the kiosk 10. This level may be reached through a single pulse train, but may require several pulse trains. Since the 1 kHz frequency has the lowest threshold value, it will be detected first. As the user approaches the kiosk 10, the amplitude of the reflected waveform increases (although never equal to the transmitted amplitude due to attenuation), and the 10 kHz, 100 kHz, and the 500 kHz thresholds will be exceeded depending on how close the user is to the kiosk 10 thereby generating the appropriate signals/set bits. An increase in the number of set bits (thresholds exceeded) will indicate that the user 46 is walking toward the kiosk 10. The processing unit 22 interprets the set bits to determine how close the user is to the kiosk 10 and either powers up (turns on) the kiosk 10 from a dormant or standby state, changes modes, or performs another task accordingly. It should be appreciated that various schemes are possible. As long as the user 46 is not moving the number of flags will remain constant. As the user 46 leaves the kiosk 10, the number of thresholds being met or exceeded will decrease indicating that the user 46 is walking away from the kiosk 10. If the user 46 passes by but does not approach the kiosk 10, only the first one or two frequency thresholds will trigger.

In this manner, the distance of a consumer is ascertained by the number of thresholds exceeded, while the movement of the consumer is ascertained by the time between the exceeding of the various thresholds.

In accordance with one aspect of the present invention and with particular reference to FIG. 4, there is shown a block diagram of another embodiment of the present kiosk 10. Only those differences between the embodiment of FIG. 2 and the embodiment of FIG. 4 will be discussed with reference to FIG. 4. It should be understood that the remainder of kiosk 10 as depicted in FIG. 4 functionally and structurally remain the same. In FIG. 4, the receiver/detector 20 communicates with an analog to digital (A/D) converter 76 through data communication line 78. The A/D converter 76 is in data communication with the processing unit 22 via data communication line 80. Utilizing the exemplary scenario described with reference to FIG. 3, the detector 20 receives the multi-frequency waveform or pulse train that has been transmitted by the transmitter 18 and reflected from the user 46. The received reflected waveform is communicated to the A/D converter 76 via communication line 78 which converts the waveform pulses into their digital equivalent. The now digital signal is communicated to the processing unit 22 via communication line 80. The processing unit recreates the frequencies and amplitudes from the received digital signal and triggers or sets bits as appropriate to determine actual location or the movement of the user 46 relative to the kiosk 10.

Additionally, the embodiment of FIG. 4 allows the use of a single frequency emitted from transmitter 18 that is digitized by the A/D converter and processed by the processing unit 20 by varying the duty cycle of the transmission.

It should also be appreciated that while the detector 20 is described above as an analog device, the detector 20 may be a detector/transducer, such as a charge-coupled device (CCD) that is sensitive to the particular radiation emitted by transmitter 18, that receives the reflected waveform and produces a digital output signal for direct processing by the processing unit 22. If the detector is digital, then there would be no need for the A/D converter. Other variations are possible in accordance with the principles of the present invention. The transmitter 18 and detector 20 thus together with other appropriate components as necessary and defined herein, and appropriate logic via processing unit 22 define a proximity detector that is able to ascertain whether a user is i) approaching or walking towards the kiosk 10, ii) leaving or walking away from the kiosk 10, or iii) passing or walking by the kiosk 10, as well as the approximate distance the user is to the kiosk.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected.

What is claimed is:

1. A retail terminal comprising:
   a transceiver for (i) transmitting a pulse train signal, and (ii) receiving a return pulse train signal produced by reflection of the pulse train signal from a consumer;
   a processing unit electrically coupled to said transceiver; and
   a memory device electronically coupled to said processing unit, wherein said memory device has stored therein a plurality of instructions which, when executed by said processing unit, causes said processing unit to:
   (a) transmit said pulse train signal with said transceiver;
   (b) receive any said return pulse train signal with said transceiver,
   (c) analyze said return pulse train signal to determine if the consumer producing the return pulse train signal is approaching or leaving the retail terminal,
   (d) produce a consumer movement signal in response to and consistent with the determination of whether the consumer is approaching or leaving the retail terminal, and
   (e) change a mode of operation of the retail terminal depending on the consumer movement signal.

2. The retail terminal of claim 1, wherein said transceiver comprises:
   an IR transmitter; and
   an IR detector.

3. The retail terminal of claim 1, wherein:
said pulse train signal comprises a sequence of frequencies with each frequency pulsed for a predetermined period of time at a predetermined amplitude; and
said memory device has further stored therein a further plurality of instruction which, when executed by said processing unit, further causes said processing unit further to analyze said return pulse train signal comprising a return sequence of frequencies to determine if the consumer producing said return pulse train signal is approaching or leaving the retail terminal by (i) comparing the amplitude of each return frequency of said return sequence of frequencies to a threshold amplitude stored in said memory device corresponding to each frequency of said sequence of frequencies, (ii) generating and storing a threshold exceeded flag for each frequency of said return sequence of frequencies of which said threshold amplitude has been exceeded, and (iii) if the number of threshold exceeded flags increases during a predetermined time period, then producing an approaching consumer movement signal, else if the number of threshold exceeded flags decreases during a predetermined time period, then producing a leaving consumer movement signal.

4. The retail terminal of claim 3, wherein said memory device has further stored therein a further plurality of instructions which, when executed by said processing unit, further causes said processing unit to:
(a) repeatedly transmit said pulse train signal with said transceiver,
(b) repeatedly receive any said return pulse train signal, and
(c) repeatedly analyze any said repeating return pulse train signals to determine if the consumer producing the repeating return pulse train signal is approaching or leaving the retail terminal.

5. The retail terminal of claim 3, further comprising:
said transceiver having a transmitter electronically coupled to said processing unit and a detector electronically coupled to said processing unit; and
a plurality of filters electronically coupled between said detector and said processing unit, each filter responsive to pass one of said frequencies of said sequence of frequencies.

6. The retail terminal of claim 3, further comprising:
said transceiver having a transmitter electronically coupled to said processing unit and a detector electronically coupled to said processing unit and a detector electronically coupled to said processing unit;
an analog to digital converter electronically coupled to said processing unit; and
wherein said memory device has further stored therein a further plurality of instructions which, when executed by said processing unit, further causes said processing unit to first recreate any return frequencies received from said analog to digital converter.

7. A retail terminal comprising:
an audio/video device operable in a first mode and a second mode;
a transmitter for emitting a pulse train signal comprising a series of different frequencies with each different frequency transmitted for a predetermined period of time at a predetermined amplitude;
a detector for receiving a consumer reflected pulse train signal;
a processing unit electrically coupled to said audio/video device, said transmitter and said detector; and
a memory device electrically coupled to said processing unit, wherein said memory device has stored therein a plurality of instructions which, when executed by said processing unit, causes said processing unit to:
(i) repeatedly transmit said pulse train signal with said transmitter,
(ii) continuously receive any said consumer reflected pulse train signals,
(iii) separate any said consumer reflected pulse train signals into their component frequencies,
(iv) compare the amplitude of each component frequency to a threshold value for each component frequency and produce a threshold exceeded signal for each frequency whose amplitude exceeds its corresponding threshold amplitude value,
(v) determine from the threshold exceeded signals whether a consumer is approaching or leaving the retail terminal,
(vi) produce a first control signal if it is determined that a consumer is approaching the retail terminal, and produce a second control signal if it is determined that a consumer is leaving the retail terminal, and
(vii) use said first or second control signal to change modes of said audio/video device.

8. The retail terminal of claim 7, wherein said transmitter comprises an IR transmitter, and said detector comprises an IR detector.

9. The retail terminal of claim 7, further comprising a plurality of filters electronically coupled between said detector and said processing unit, each said filter configured to separate different frequencies of said series of different frequencies.

10. The retail terminal of claim 7, further comprising:
an analog to digital converter electronically coupled between said detector and said processing unit; and
wherein said memory device has further stored therein a further plurality of instructions, which when executed by said processing unit, further causes said processing unit to first recreate any return frequencies received from said analog to digital converter.

11. The retail terminal of claim 7, wherein said first mode is a run mode and said second mode is a power-down mode, and said first control signal causes operation in said second mode to change to operation in said first mode.

12. A method of operating a retail terminal, comprising the steps of:
(a) transmitting a pulse train signal with a transmitter;
(b) receiving any return pulse train signal produced by reflection of the pulse train signal from a consumer with a detector;
(c) processing the return pulse train to determine if the consumer producing the return pulse is approaching or leaving the retail terminal by a processing unit;
(d) producing a consumer movement signal in response to and consistent with the determination of whether the consumer is approaching or leaving the retail terminal; and
(e) changing a mode of operation of the retail terminal depending on the consumer movement signal.

13. The method of claim 12, wherein said pulse train signal comprises a sequence of frequencies with each frequency pulsed for a predetermined period of time at a predetermined amplitude.

14. The method of claim 12, further comprising the steps of:
continuously repeating steps (a)–(e).

15. The method of claim 14, wherein the step of processing the return pulse train to determine if the consumer producing the return pulse is approaching or leaving the retail terminal, comprises the steps of:

(a) comparing the amplitude of each return frequency of the return sequence of frequencies to a threshold amplitude stored in the memory device corresponding to each frequency of the sequence of frequencies;

(b) generating and storing a threshold exceeded flag for each frequency of the return sequence of frequencies of which the threshold amplitude has been exceeded; and (c) producing an approaching consumer movement signal if the number of threshold flags increases, else producing a leaving consumer movement signal if the number of threshold flags decreases, then producing a leaving consumer movement signal.

16. The method of claim 15, further comprising the step of:

(a) filtering the return sequence of frequencies into component frequencies before the step of comparing the amplitude of each return frequency of the return sequence of frequencies to a threshold amplitude stored in the memory device corresponding to each frequency of the sequence of frequencies.

17. A method of claim 15, further comprising the step of:

(a) digitizing the return sequence of frequencies by an analog to digital converter before the step of comparing the amplitude of each return frequency of the return sequence of frequencies to a threshold amplitude stored in the memory device corresponding to each frequency of the sequence of frequencies.

18. A method of operating a retail terminal comprising the steps of:

(a) providing an audio/video device operable in a first mode and a second mode;

(b) repeatedly emitting a pulse train signal from a transmitter, the pulse train signal including a sequence of a plurality of frequencies with each frequency of the plurality of frequencies emitted for predetermined period of time at a predetermined amplitude;

(c) continuously receiving any return pulse train signals produced by reflection of the pulse train signal from a consumer by a detector;

(d) separating any return pulse train signal into component frequencies;

(e) comparing the amplitude of each component frequency to a threshold value for each component frequency and producing a threshold exceeded signal for each frequency whose amplitude exceeds its corresponding threshold amplitude value, (f) determining from the threshold exceeded signals whether a consumer is approaching or leaving the retail terminal, wherein if the number of threshold exceeded signals increases then the consumer is approaching the retail terminal, else if the number of threshold exceeded signals decreases then the consumer is leaving the retail terminal; and (g) producing a control signal based on the step of determining whether a consumer is approaching or leaving the retail terminal that is operable to change modes of the audio/video device.

19. The method of operating a retail terminal of claim 18, wherein the step of separating any return pulse train signal into component frequencies comprises the step of filtering any return pulse train signal by a plurality of filters.

20. The method of operating a retail terminal of claim 18, wherein the step of separating any return pulse train signal into component frequencies comprises the step of digitizing any return pulse train signal by an analog to digital converter.

* * * * *